US008894491B2

(12) United States Patent
Grant et al.

(10) Patent No.: US 8,894,491 B2
(45) Date of Patent: Nov. 25, 2014

(54) MULTI-STAGE VARIABLE RESISTANCE TRIGGER

(75) Inventors: Anthony John Grant, Redmond, WA (US); Gary Strowe, Snohomish, WA (US); Vasco Rubio, Edmonds, WA (US); Glen E. Tennison, Monroe, WA (US); Eph John Evans, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 13/315,734

(22) Filed: Dec. 9, 2011

(65) Prior Publication Data

US 2013/0147610 A1 Jun. 13, 2013

(51) Int. Cl.
*A63F 9/24* (2006.01)

(52) U.S. Cl.
USPC .................................. 463/39; 463/36; 463/37

(58) Field of Classification Search
USPC .................. 463/36, 37, 38, 39; 124/31, 38
See application file for complete search history.

(56) References Cited

U.S. PATENT DOCUMENTS

| 5,734,373 | A | * | 3/1998 | Rosenberg et al. ........... 345/161 |
| 5,857,986 | A | | 1/1999 | Moriyasu |
| 6,564,788 | B1 | * | 5/2003 | Hu .................................. 124/66 |
| 6,693,622 | B1 | | 2/2004 | Shahoian et al. |
| 7,335,134 | B1 | | 2/2008 | LaVelle |
| 7,561,141 | B2 | | 7/2009 | Shahoian et al. |
| 7,967,679 | B2 | | 6/2011 | Ombrellaro et al. |
| 2001/0023205 | A1 | | 9/2001 | Kikukawa et al. |
| 2002/0190528 | A1 | | 12/2002 | Ootori |
| 2006/0046843 | A1 | | 3/2006 | Nakajima |
| 2008/0227546 | A1 | | 9/2008 | Roberts |
| 2008/0297328 | A1 | | 12/2008 | Crawford et al. |
| 2009/0233769 | A1 | | 9/2009 | Pryor |
| 2010/0160016 | A1 | | 6/2010 | Shimabukuro et al. |
| 2010/0173686 | A1 | * | 7/2010 | Grant et al. ........................ 463/2 |
| 2011/0095877 | A1 | | 4/2011 | Casparian et al. |
| 2011/0163860 | A1 | | 7/2011 | Ryu et al. |

FOREIGN PATENT DOCUMENTS

| CN | 1336842 A | 2/2002 |
| EP | 1852162 A1 | 11/2007 |
| JP | 10020951 A | 1/1998 |
| JP | 2000210467 A | 8/2000 |
| JP | 2002210242 A | 7/2002 |
| JP | 2007299706 A | 11/2007 |

OTHER PUBLICATIONS

Alahakone, et al., "Vibrotactile Feedback Systems: Current Trends in Rehabilitation, Sports and Information Display", Retrieved at <<http://ieeexplore.ieee.org/stamp/stamp.jsp?tp=&arnumber=5229741>>, IEEE/ASME International Conference on Advanced Intelligent Mechatronics, Jul. 14-17, 2009, pp. 1148-1153.

(Continued)

*Primary Examiner* — Damon Pierce
(74) *Attorney, Agent, or Firm* — Gregg Wisdom; Judy Yee; Micky Minhas

(57) ABSTRACT

A multi-stage variable resistance triggers includes an input device comprising a communicative output configured to send control information to a computing device for controlling the computing device. The input device further comprises a multi-stage variable resistance trigger assembly configured to provide a first trigger resistance sub-profile throughout a first stage of a trigger pull and a second trigger resistance sub-profile throughout a second stage of the trigger pull.

18 Claims, 6 Drawing Sheets

(56) References Cited

OTHER PUBLICATIONS

Michelitsch, et al., "Multi-Finger Haptic Interaction within the MIAMM Project", Retrieved at <<http://miamm.loria.fr/doc_publique/publications/EuroHapticsAbstract.pdf>>, EuroHaptics, Jul. 8-10, 2002, pp. 6.

Casiez, et al., "Elastic Force Feedback with a New Multi-finger Haptic Device: The DigiHaptic", Retrieved at <<http://www.lifl.fd/~casiez/publications/eurohaptics03-casiez.pdf>>, Eurohaptics, Jul. 6-9, 2003, pp. 6.

Johansson, et al., "Using Simple Force Feedback Mechanisms as Haptic Visualization Tools", Retrieved at <<http://ieeexplore.ieee.org/stamp/stamp.jsp?tp=&arnumber=776980>>, Instrumentation and Measurement Technology Conference, pp. 820-824, May 26, 1999, pp. 5.

Grant, Anthony J. et al., "Force Feedback Triggers," U.S. Appl. No. 13/361,830, filed Jan. 30, 2012, 23 pages.

"International Search Report", Mail Date: Mar. 15, 2013, Application No. PCT/US2012/067811, Filed date: Dec. 5, 2012, pp.-9.

The State Intellectual Property Office of the People's Republic of China, Office Action Issued in Chinese Patent Application 201210525091.1, Jul. 29, 2014, 11 pages.

\* cited by examiner

US 8,894,491 B2

MULTI-STAGE VARIABLE RESISTANCE TRIGGER

BACKGROUND

Gaming controllers often include a variety of different buttons, directional controllers, and other mechanisms that translate user input into commands for controlling games. However, such gaming controllers often do not provide a satisfying gaming experience because the gaming controllers do not provide the user with realistic feedback.

SUMMARY

Embodiments are disclosed that relate to multi-stage variable resistance triggers. One disclosed embodiment includes an input device comprising a communicative output configured to send control information to a computing device for controlling the computing device. The input device further comprises a multi-stage variable resistance trigger assembly configured to provide a first trigger resistance sub-profile throughout a first stage of a trigger pull and a second trigger resistance sub-profile throughout a second stage of the trigger pull.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to computing system input devices including a multi-stage variable resistance trigger assembly configured to provide a multi-stage variable trigger resistance profile. In particular, a trigger assembly of a device such as a game controller may be configured to provide a first trigger resistance sub-profile throughout a first stage (e.g., a beginning range) of a trigger pull and a second trigger resistance sub-profile throughout a second stage (e.g., an ending range) of the trigger pull. It will be understood that the term "resistance profile" as used herein may refer to any force or combination of forces over a full range of a trigger displacement acting against an external force applied to the trigger. It will be further understood that "resistance sub-profile" refers to any force or combination of forces over a portion of a trigger displacement acting against an external force applied to the trigger. It will be further understood that the term "resistance" may be used to refer to either a "resistance profile" or a "resistance sub-profile." Such resistance may be provided by, for example, magnets, tension springs, and/or torsion springs. Specific embodiments utilizing such elements will be discussed in detail below.

When used in conjunction with a gaming device, a multi-stage variable resistance trigger assembly may provide a more realistic gaming experience. For example, in a first-person shooting game, multiple stages may provide a feel to the user approximating the feel of the trigger assembly on a real weapon. Specifically, the transition between a first stage and a second stage may be substantially discontinuous as to mimic the "release" of a real gun trigger while firing of a real bullet.

Figure 1:
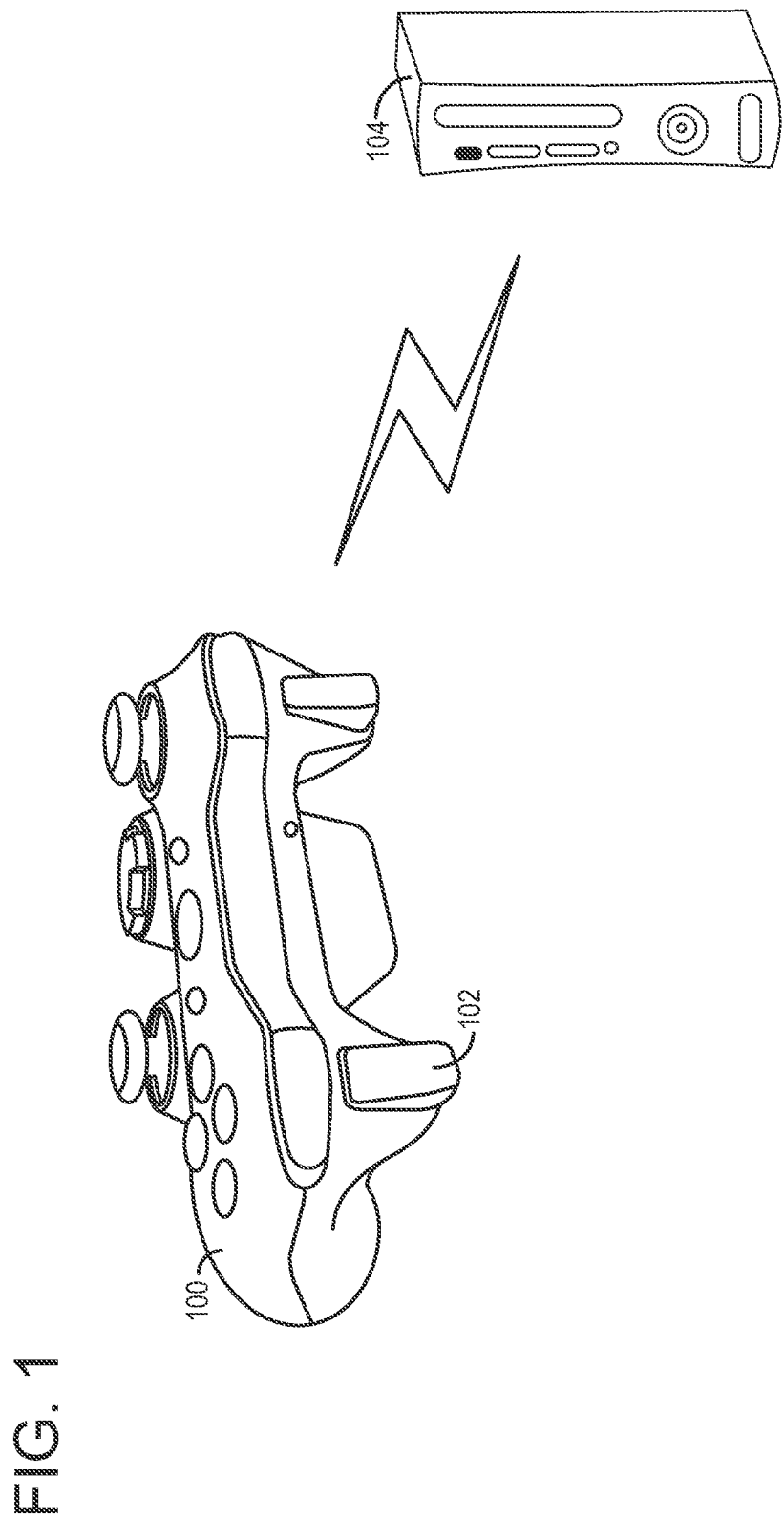
FIG. 1 shows a non-limiting example of an input device in accordance with an embodiment of the present disclosure.

FIG. 1 shows a non-limiting example of an input device 100 including a trigger 102 for providing multi-stage variable resistance to a user of the input device. Triggers, as discussed in the entirety of this application, refer to any user-actuatable input mechanism. Input device 100 further includes a communicative output configured to send control information to a computing device 104 for controlling the computing device. The input device may communicate with computing device 104 via a wireless connection, a wired connection, or a combination thereof. For example, the wireless communication may be performed via infrared light, visible light, radio-frequency (e.g., 802.11 or mobile telephony), or a combination thereof. The communication may be accomplished via any combination of encodings, carrier frequencies, and protocols, both open and proprietary. Input device 100 may be used, for example, to control the motion of a game character rendered by computing device 104 and displayed via a display device.

Input device 100 may be configured to be held in one or both hands. Furthermore, trigger 102 may be configured to be actuated by one or more fingers (e.g., an index finger). In other embodiments, trigger 102 may be configured to be actuated by other mechanisms. It will be understood that trigger 102 may be arranged within or upon input device 100 in any suitable configuration. For example, although trigger 102 is illustrated on the rear of input device 100, in some embodiments trigger 102 may be arranged on the top of input device 100.

Figure 2:
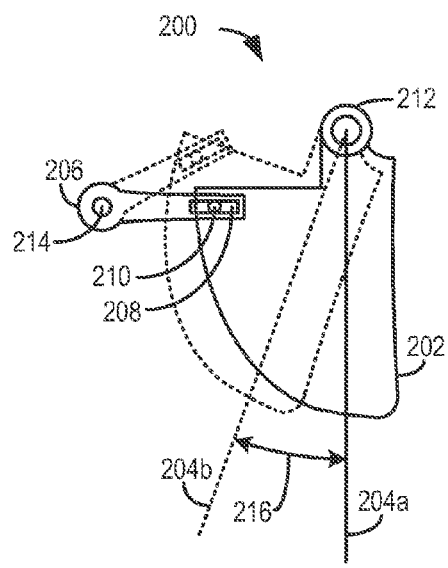
FIG. 2 shows a non-limiting example of a trigger configured to rotate about an axis.

FIG. 2 shows a non-limiting example of a multi-stage variable resistance trigger assembly 200. Assembly 200 includes a trigger 202 at a rest position (illustrated by pull indicator 204a). It will be understood that the term "rest position" as used herein refers to the position of the trigger assembly absent an applied external force. Trigger 202 is mechanically coupled to button actuator 206. Button actuator 206 includes a guide 208 in which a pivot 210 of trigger 202 is configured to move. In other embodiments, trigger 202 may be coupled to button actuator 206 in another suitable manner.

As force is applied to trigger 202 (e.g., via an index finger), trigger 202 is configured to rotate about axis 212. As trigger 202 rotates, pivot 210 moves within guide 208, thus causing button actuator 206 to rotate about axis 214. The movement of button actuator 206 may be translated into a representative electrical signal via any suitable mechanism. For example, in some embodiments, actuator 206 may be coupled to a potentiometer at axis 214. In some embodiments, the movement of actuator 206 may be converted to an electrical signal via a mechanical sensor (e.g., a limit switch), an optical sensor (e.g., an optical encoder or an optical break sensor), a magnetic sensor (e.g., a magnetic reed switch), a capacitive sensor, or a combination thereof. Said electrical signal may be either digital or analog.

Trigger 202 and button actuator 206 are configured to rotate until reaching an end position (illustrated by the dashed outline and pull indicator 204b). It will be understood that the term "end position" as used herein refers to the limiting position of the trigger assembly under an external force. The range of the pull (illustrated as angle 216) of trigger 202 spans from the rest position (illustrated by pull indicator 204a) to the end position (illustrated by pull indicator 204b).

Figure 3:
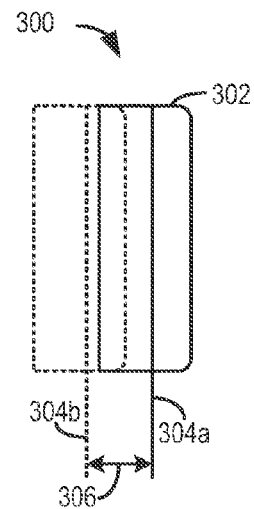
FIG. 3 shows a non-limiting example of a trigger configured to move linearly.

As mentioned above, suitable triggers may include many configurations. For example, FIG. 3 shows a non-limiting example of a multi-stage variable resistance trigger assembly 300. Assembly 300 includes a trigger 302 at a rest position (illustrated by pull indicator 304a). As force is applied to trigger 302, trigger 302 is configured to move in a substantially linear direction until reaching an end position (illustrated by the dashed outline and pull indicator 304b). In other embodiments, assembly 300 may instead be configured to move in an angled or arcing path. The range of the pull (illustrated as displacement 306) of trigger 302 spans from the rest position (illustrated by pull indicator 304a) to the end position (illustrated by pull indicator 304b). It will be understood that assembly 300 is distinguished from assembly 200 of FIG. 2 in that assembly 300 is not configured to rotate about an axis. Other trigger variations may be used without departing from the scope of this disclosure.

Figure 4:
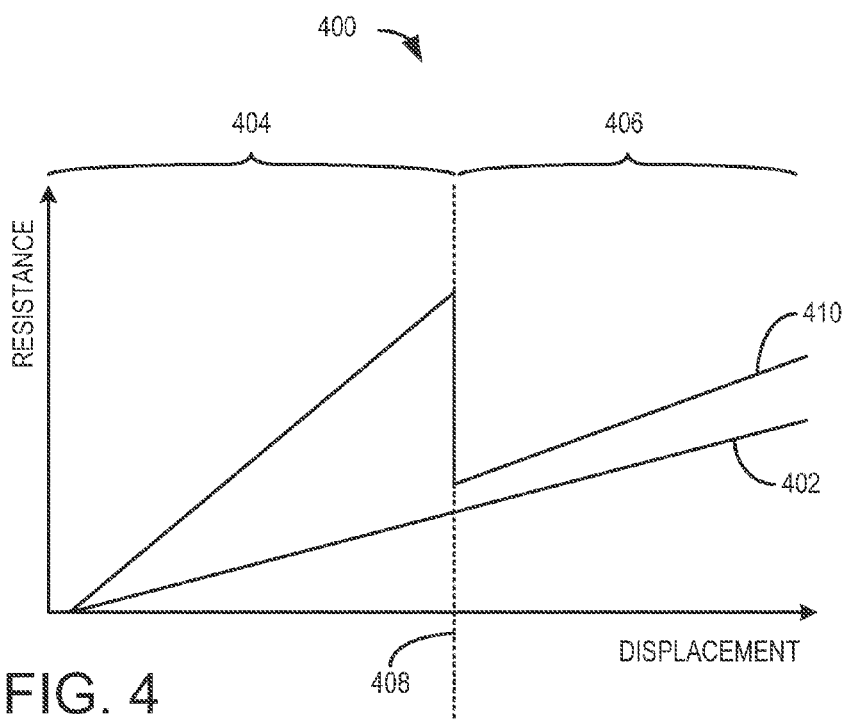
FIG. 4 shows a visual representation of trigger resistance profiles.

The triggers of FIGS. 2 and 3 may be configured to provide various resistance profiles over the range of the trigger pull. FIG. 4 shows a visual representation 400 of example trigger resistance profiles. For example, profile 402 may represent a "standard" resistance profile as provided by a trigger assembly without multi-stage resistance (e.g., via a single spring).

In other instances, a multi-stage trigger may have two or more stages in which the trigger provides different resistance sub-profiles. The resistance profile of such triggers may be provided by a first subassembly providing a first subassembly resistance profile and a second subassembly providing a second subassembly resistance profile. The trigger assembly may be configured to provide a first resistance sub-profile throughout a beginning range of a trigger pull and a second trigger resistance sub-profile throughout an ending range of the trigger pull.

As a nonlimiting example, a resistance profile may include a first stage 404 over a beginning range of the trigger pull and a second stage 406 over an ending range of the trigger pull. First stage 404 and second stage 406 may be divided at transition 408. Transition 408, for example, may be an intermediate angle within angle 216 of FIG. 2, or an intermediate displacement within displacement 306 of FIG. 3. As discussed above, it will be understood that a resistance profile may have more than two stages.

Profile 410 may represent a profile in accordance with one or more embodiments of the present disclosure. Profile 410 includes a first sub-profile in stage 404. After transition 408, profile 410 includes a second sub-profile in stage 406. While profile 410 is illustrated as a combination of two substantially linear sub-profiles, it will be understood that said sub-profiles may follow any suitable function. For example, sub-profiles may be linear, constant, logarithmic, exponential, increasing with displacement, decreasing with displacement, or any piece-wise combination thereof. Such functions are presented for the purpose of example, and are not intended to be limiting in any manner.

While profile 410 is illustrated as being discontinuous at transition 408, it will be understood that in some instances, a resistance profile may be substantially continuous at one or more stage boundaries. Transition 408 is meant to illustrate a change in which assemblies are providing resistance. The discontinuity at transition 408 may, in some embodiments, provide a feel similar to the "release" of a trigger of a weapon.

The resistance profile, in whole or in part, may be specified by trigger resistance information received from a computing device (e.g., computing device 104 of FIG. 1) via a communicative input (e.g., via a wired and/or wireless connection).

The trigger resistance information may be consistent during a single use of the computing device. The computing device may specify trigger resistance information according to one or more settings of software (e.g., a video game) executing on the computing device. For example, if the software is a first-person shooting game, a multi-stage resistance profile (e.g., profile 410 of FIG. 4) may be specified to mimic the feel of a trigger pull of a weapon.

In other embodiments, the trigger resistance information may vary throughout a single use of the computing device. Settings may specify different resistance profiles for use in different segments of the same game or other application. For example, returning to the shooting game scenario, a multi-stage resistance profile (e.g., profile 410 of FIG. 4) may be specified for a first part of the game (e.g., firing a rifle), while a standard profile (e.g., profile 402 of FIG. 4) may be specified for a second part of the game (e.g., driving a vehicle).

In some instances, the shape of the resistance profile may be substantially fixed such that the computing device may specify the magnitude of the resistance profile without substantially altering the shape of the resistance profile.

Figure 5A:
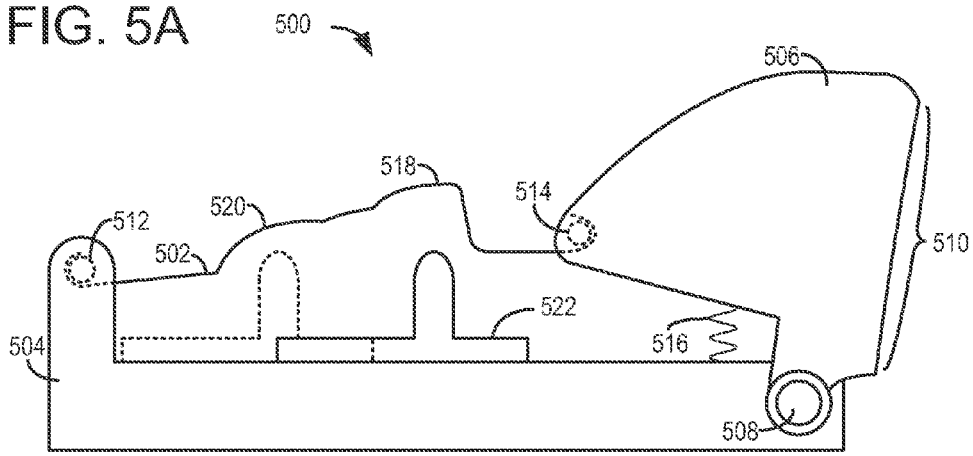
FIG. 5A shows a non-limiting example of a trigger assembly including a flat spring in accordance with an embodiment of the present disclosure.

As discussed above, resistance may be provided via any suitable type and combination of subassemblies. FIG. 5A shows a non-limiting example of a trigger assembly 500 including a flat spring 502 in accordance with an embodiment of the present disclosure. Assembly 500 includes support structure 504 configured to support or otherwise interact with one or more elements of assembly 500. While illustrated as a single structure, it will be understood that structure 504 may include a plurality of individual structures. In some embodiments, structure 504 may be incorporated into the body of an input device. Assembly 500 further includes trigger 506 configured to rotate about axis 508 in the presence of an external force applied to edge 510 of trigger 506.

Assembly 500 further includes flat spring 502 coupled to support structure 504 at structure mount 512 and to trigger 506 at trigger mount 514. Although flat spring 502 is illustrated as being formed around circular mounts 512 and 514 such that spring 502 is able to rotate/move about said mounts, it will be understood that the flat spring 502 may be coupled to structure 504 and to trigger 506 in any suitable manner. For example, in some embodiments, one or more of mounts 512 and 514 may include a bearing coupled to spring 502 and configured to rotate about an axis. In other embodiments, one or more of mounts 512 and 514 may comprise adhesive and/or other elements configured to provide a "fixed" mounting.

As trigger 506 rotates about axis 508, trigger 506 interacts with trigger spring 516. Specifically, trigger spring 516 resists pivoting of trigger 506 about axis 508 throughout the entire range of motion of trigger 506. In some embodiments, spring 516 may include more than one spring operating in parallel and/or series. Trigger spring 516 may be coupled to trigger 506 and structure 504 in any suitable manner. For example, spring 516 may be attached to trigger 506 and/or structure 504 with adhesive. In other embodiments, spring 516 may be configured to partially extend over a tab of trigger 506 and/or a tab of structure 504. It will be understood that such scenarios are provided for the purpose of example and are not meant to be limiting in any manner.

As trigger 506 rotates about axis 508, trigger 506 also interacts with flat spring 502 such that flat spring 502 resists pivoting of trigger 506 about axis 508 based on the position of resistance selection structure 522. Specifically, as trigger 506 rotates, flat spring 502 pivots (or, in the case of a "fixed mount", bends) about structure mount 512. As the pivot spring 502 moves, one or more of a first cam profile 518 and a second cam profile 520 are configured to interact with resistance selection structure 522. Resistance selection structure 522 acts as a fulcrum about which the flat spring 502 pivots.

Resistance selection structure 522 is moveable to a first position (illustrated as a solid line) in order to interact with the first cam profile 518 or to a second position (illustrated as a dotted line) in order to interact with the second cam profile 520. Resistance selection structure 522 may be moveable by a user-actuatable mechanism, an electromechanical device (e.g., a motor or solenoid), or a combination thereof. Furthermore, resistance selection structure 522 may be configured to move between the first position and second position during the course of the trigger pull. It will be further understood that flat spring 502 may include any number of cam profiles, and thus resistance selection structure 522 may be moveable to any number of positions.

Figure 5B:
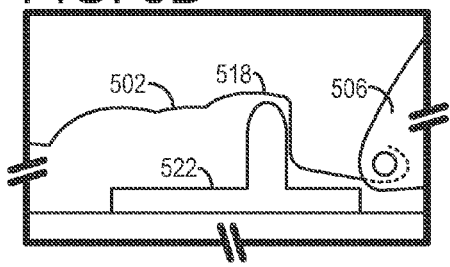
FIG. 5B shows a close-up view of a portion of the assembly of FIG. 5A.

FIG. 5B shows a close-up view of a portion of the assembly 500 of FIG. 5A. Trigger 506 is at the "end" position and resistance selection structure 522 is in the first position as described above. As shown, the first cam profile 518 of flat spring 502 is configured such that trigger 506 reaches the "end" position without spring 502 substantially interacting with resistance selection structure 522. As such, the resistance provided by flat spring 502 to trigger 506 may be substantially negligible throughout the entire range of motion of trigger 506 if resistance selection structure 522 is in the position illustrated in FIG. 5B.

Figure 5C:
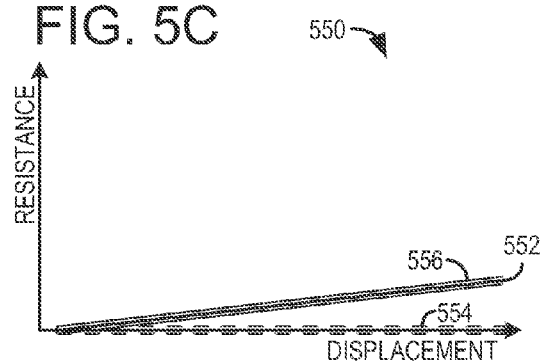
FIG. 5C shows a visual representation of a trigger resistance profile of the assembly of FIG. 5B.

FIG. 5C shows a visual representation 550 of a trigger resistance profile 552 (illustrated as a double line) of the assembly of FIG. 5B. Visual representation 550 further includes a resistance profile 554 provided by flat spring 502 (illustrated as a double dashed line) and a resistance profile 556 provided by trigger spring 516 (illustrated as a single line). As described above, resistance profile 552 is substantially the same as resistance profile 556 of trigger spring 516 throughout the entire range of the trigger pull. As such, the resistance profile 552 provided by the assembly of FIG. 5B is similar to that provided by a "standard" trigger (e.g., profile 402 of FIG. 4A).

Figure 5D:
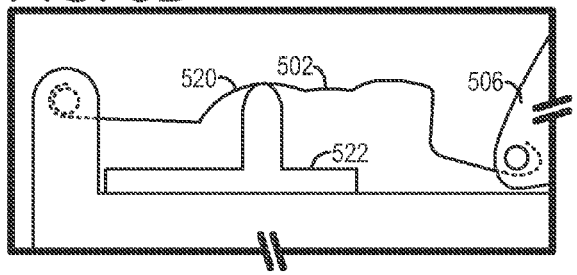
FIG. 5D shows a close-up view of a portion of the assembly of FIG. 5A.

FIG. 5D shows a close-up view of a portion of the assembly 500 of FIG. 5A. As with FIG. 5B, trigger 506 is at the "end" position. In contrast to FIG. 5B, resistance selection structure 522 of FIG. 5D is in the second position as described above. As shown, the second cam profile 520 of flat spring 502 is configured such that flat spring 502 interacts with resistance selection structure 522 during a portion of the trigger pull. Specifically, flat spring 502 is configured to bend about resistance selection structure 522 at second cam profile 520. Such bending of flat spring 502 provides resistance to trigger 506 by resisting rotation of trigger 506 about axis 508.

Figure 5E:
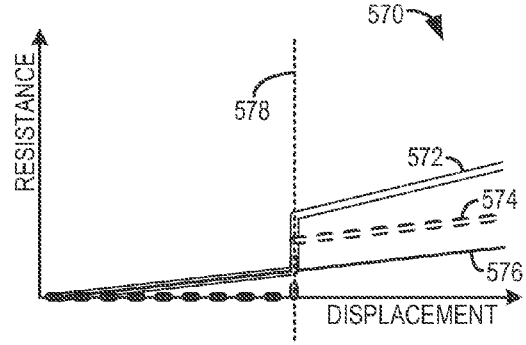
FIG. 5E shows a visual representation of a trigger resistance profile of the assembly of FIG. 5D.

FIG. 5E shows a visual representation 570 of a resistance profile 572 (illustrated as a double line) of the assembly of FIG. 5D. Visual representation 570 further includes a resistance profile 574 provided by flat spring 502 (illustrated as a double dashed line) and a resistance profile 576 provided by trigger spring 516 (illustrated as a single line). As shown, during a beginning range of the trigger pull (e.g., before transition 578) in which resistance selection structure 522 does not interact with second cam profile 520, resistance 572 includes resistance 576 provided to trigger 506 by trigger spring 516. During an ending range of the trigger pull (e.g., after transition 578) in which resistance selection structure 522 does interact with second cam profile 520, resistance 572 includes resistance 574 provided to trigger 506 by flat spring 502 and resistance 576 provided to trigger 506 by trigger spring 516.

Figure 6A:
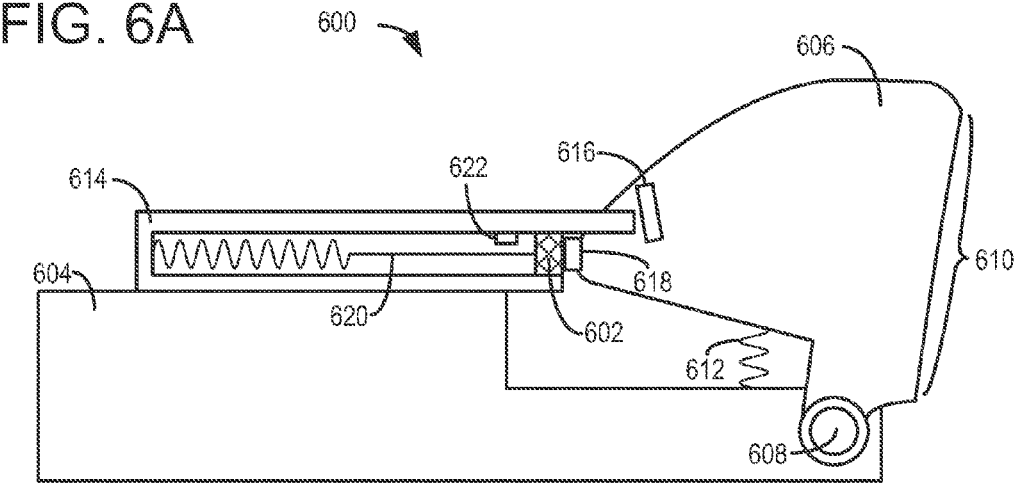
FIG. 6A shows a non-limiting example of a trigger assembly including a magnet in accordance with an embodiment of the present disclosure.

FIG. 6A shows a non-limiting example of a trigger assembly 600 including a magnet 602 in accordance with another embodiment of the present disclosure. Assembly 600 includes support structure 604 configured to support or otherwise interact with one or more elements of assembly 600. While illustrated as a single structure, it will be understood that structure 604 may include a plurality of individual structures. In some embodiments, structure 604 may be incorporated into the body of an input device. Assembly 600 further includes trigger 606 configured to rotate about axis 608 in the presence of an external force applied to edge 610 of trigger 606.

As trigger 606 rotates about axis 608, trigger 606 interacts with trigger spring 612. Specifically, trigger spring 612 resists pivoting of trigger 606 about axis 608 throughout the entire range of motion of trigger 606. In some embodiments, spring 612 may include more than one spring operating in parallel and/or series. Trigger spring 612 may be coupled to trigger 606 and to structure 604 in any suitable manner. For example, spring 612 may be attached to trigger 606 and/or structure 604 with adhesive. In other embodiments, spring 612 may be configured to partially extend over a tab of trigger 606 and/or a tab of structure 604. It will be understood that such scenarios are provided for the purpose of example, and are not intended to be limiting in any manner.

As trigger 606 rotates about axis 608, trigger 606 also interacts with slider assembly 614. Specifically, tab 616 coupled to trigger 606 interacts with an edge of slider assembly 614, thus both effecting substantially lateral motion of assembly 614 and resisting pivoting of trigger 606 about axis 608 due to friction between assembly 614 and structure 604. In some embodiments, assembly 614 may instead move in an angled or arcing path. In other embodiments, assembly 614 may be coupled to trigger 606 via a pivot and/or groove.

Assembly 600 further includes a striker plate 618 mechanically coupled to trigger 606. Striker plate 618 may be coupled to trigger 606 via any suitable mechanism. For example, striker plate 618 may be configured to fit into one or more grooves in trigger 606. In other embodiments, striker plate 618 may be coupled to trigger 606 with adhesive. Striker plate 618 may be any magnetic material or combination of materials capable of interacting with magnet 602. For example, in some embodiments, one or more of magnet 602 and striker plate may be an electromagnet.

During the beginning range of a trigger pull, striker plate 618 is adjacent to magnet 602. As such, a magnetic force resists separation of striker plate 618 from magnet 602.

Assembly 600 further includes tension spring 620 coupled to both slider assembly 614 and magnet 602. As such, it will be understood that magnet 602 may include a non-magnetic layer or housing in order to provide such coupling. The non-magnetic material coupled to magnet 602 may further allow magnet 602 to move within slider assembly 614, as will be discussed below. The tension spring 620 provides a force acting on magnet 602. Said force is less than the attractive force between magnet 602 and striker plate 618, such that magnet 602 remains magnetically coupled to striker plate 618 throughout a beginning range of the pull of trigger 606 (including the "rest" position).

Figure 6B:
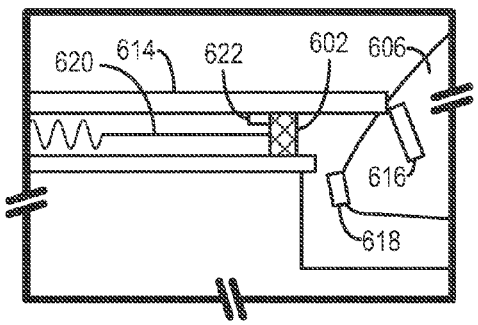
FIG. 6B shows a close-up view of a portion of the assembly of FIG. 6A.

At a certain point in the trigger pull, tab 616 displaces slider assembly 614 such that the force from tension spring 620 acting on magnet 602 is greater than the attractive force between striker plate 618 and magnet 602. FIG. 6B shows a close-up view of a portion of assembly 600 of FIG. 6A after the attractive force between magnet 602 and striker plate 618 has been overcome. Once the attractive force is overcome, tension spring 620 effects substantially linear motion of magnet 602 until magnet 602 reaches magnet stop 622. The remainder of the pull of trigger 606 therefore occurs with substantially negligible interaction from magnet 602.

Figure 6C:
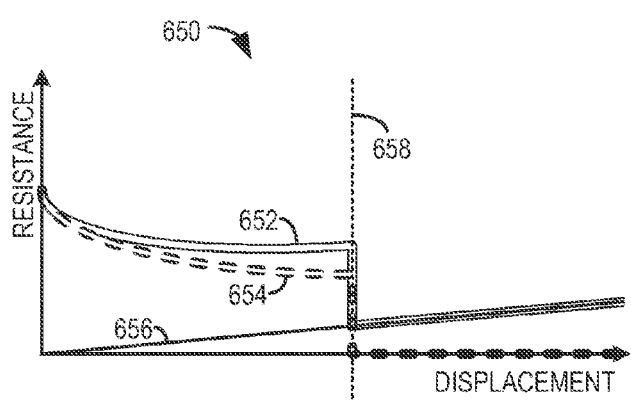
FIG. 6C shows a visual representation of a trigger resistance profile of the assembly of FIG. 6A.

FIG. 6C shows a visual representation 650 of a resistance profile 652 provided by the assembly of FIG. 6B. Visual representation 650 further includes a resistance profile 654 provided by magnetic coupling between magnet 602 and striker plate 618 (illustrated as a double dashed line) and a resistance profile 656 provided by trigger spring 612 (illustrated as a single line). As shown, during a beginning range of the trigger pull (e.g., before transition 658) in which magnet 602 does interact with striker plate 618, resistance 652 includes resistance 656 provided to trigger 606 by trigger spring 612 and resistance 654 provided by magnetic coupling between magnet 602 and striker plate 618. During an ending range of the trigger pull (e.g., after transition 658) in which magnet 602 does not interact with striker plate 618, resistance 652 includes resistance 656 provided to trigger 606 by trigger spring 612. Resistance profile 652 therefore provides a "release" feel at transition 658 similar to that provided by a trigger mechanism of a weapon.

As trigger 606 is returned to the "rest" position, striker plate 618 may pass sufficiently close to magnet 602 to effect magnetic coupling between striker plate 618 and magnet 602. As such, slider assembly 614 may be returned to its rest position via said magnetic coupling. In other embodiments, such as where trigger 606 is coupled to slider assembly 614 via a pivot, the motion of trigger 606 may directly effect motion of slider assembly 614 independent of the magnetic coupling between striker plate 618 and magnet 602. In other embodiments, slider assembly 614 may be returned to its rest position by a user-actuatable mechanism, an electromechanical device (e.g., a motor or solenoid), or a combination thereof.

Figure 7A:
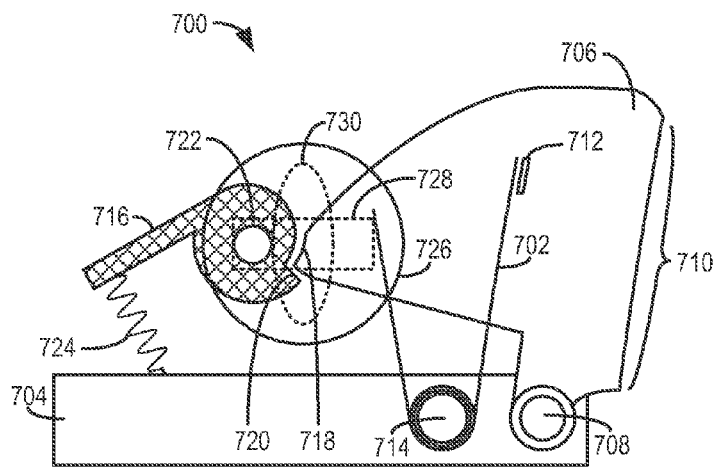
FIG. 7A shows a non-limiting example of a trigger assembly including a torsion spring in accordance with an embodiment of the present disclosure.

FIG. 7A shows a non-limiting example of a trigger assembly 700 including a torsion spring 702 in accordance with another embodiment of the present disclosure. Assembly 700 includes support structure 704 configured to support or otherwise interact with one or more elements of assembly 700. While illustrated as a single structure, it will be understood that structure 704 may include a plurality of individual structures. In some embodiments, structure 704 may be incorporated into the body of an input device. Assembly 700 further includes trigger 706 configured to rotate about axis 708 in the presence of an external force applied to edge 710 of trigger 706.

As trigger 706 rotates about axis 708, trigger 706 interacts with torsion spring 702. Specifically, tab 712 of trigger 706 effects displacement of one end of torsion spring 702. Such displacement of torsion spring 702 effects twisting of torsion spring 702 about axis 714, thus resisting rotation of trigger 706 about axis 708.

Trigger 706 is further configured to interact with load cog 716 during the beginning range of the trigger pull. Specifically, cam profile 718 of trigger 706 interacts with cam profile 720 of load cog 716. As trigger 706 rotates, the interaction between cam profiles 718 and 720 effects rotation of load cog 716 about axis 722. Such rotation is resisted by tension spring 724 coupled to the arm of load cog 716 and to support structure 704. As such, tension spring 724 provides resistance to trigger 706 by resisting rotation of trigger 706 about axis 708. Tension spring 724 may be coupled to load cog 716 and structure 704 in any suitable manner. For example, spring 724 may be attached to load cog 716 and/or structure 704 with adhesive. In other embodiments, spring 724 may be configured to partially extend over a tab of load cog 716 and/or a tab of structure 704.

Figure 7B:
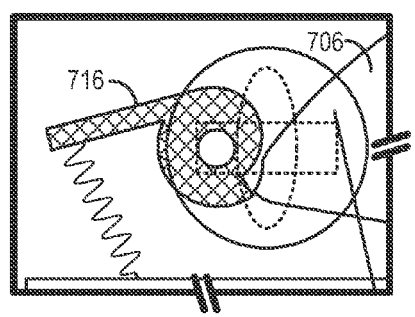
FIG. 7B shows a close-up view of a portion of the assembly of FIG. 7A.

FIG. 7B shows a close-up view of a portion of assembly 700 of FIG. 7A. Specifically, FIG. 7B shows trigger 706 during a portion of the trigger pull during which trigger 706 interacts with load cog 716.

Figure 7C:
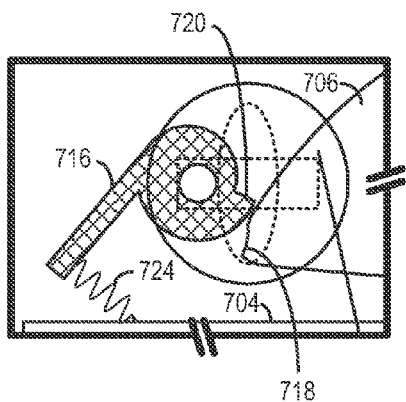
FIG. 7C shows a close-up view of a portion of the assembly of FIG. 7A.

At a certain point during the trigger pull, trigger 706 will be displaced such that cam profiles 718 and 720 no longer interact. FIG. 7C shows a close-up view of a portion of assembly 700 of FIG. 7A after such a point has been reached. Without the interaction between profiles 718 and 720, tension spring 724 returns load cog 716 to a rest position. Such a return may cause load cog 716 to interact with (e.g., strike) a portion of support structure 704 or other element of assembly 700. Such interaction may result in a "clicking" sound or other audible event, thus providing additional user feedback.

Figure 7D:
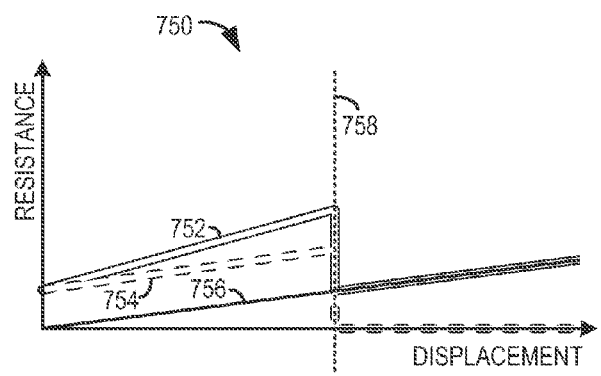
FIG. 7D shows a visual representation of a trigger resistance profile of the assembly of FIG. 7A.

FIG. 7D shows a visual representation 750 of a resistance profile 752 of the assembly of FIG. 7A. Visual representation 750 further includes a resistance profile 754 provided by tension spring 724 coupled to load cog 716 (illustrated as a double dashed line) and a resistance profile 756 provided by torsion spring 702 (illustrated as a single line). As illustrated in FIGS. 7B and 7C, during a beginning range of the trigger pull (e.g., before transition 758) in which load cog 716 does interact with trigger 706, resistance 752 includes resistance 756 provided to trigger 706 by torsion spring 702 and resistance 754 provided to trigger 706 by tension spring 724 coupled to load cog 716. During an ending range of the trigger pull (e.g., after transition 758) in which load cog 716 does not interact with trigger 706, resistance 752 includes resistance 756 provided to trigger 706 by torsion spring 702. Resistance profile 752 therefore provides a "release" feel at transition 758 similar to that provided by a trigger mechanism of a weapon.

Returning to FIG. 7A, assembly 700 further includes a rotary force switch 726. Rotary force switch 726 includes a spring profile 728 (illustrated as a rectangle) and a cog profile 730 (illustrated as an oval). It will be understood that the shape profiles 728 and 730 are provided for purpose of example, and are not intended to be limiting in any manner. Rotary force switch 726 is a resistance selection mechanism configured to rotate about a central axis which in turn causes profiles 728 and 730 to rotate. Rotary force switch 726 may be moveable via a user-actuatable mechanism (e.g., a rotatable knob, a button, or a switch), an electromechanical device (e.g., a motor or solenoid), or a combination thereof. It will be understood that, in some embodiments, rotary force switch 726 may be configured to provide a plurality of profiles (e.g., profiles 728 and 730) via a mechanism other than rotation.

Figure 8A:
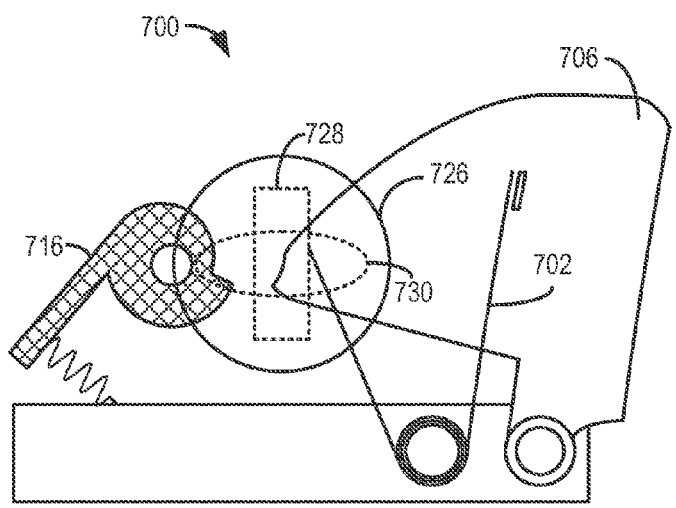
FIG. 8A shows the assembly of FIG. 7A configured to provide a different trigger resistance profile.

Rotary force switch 726 is configured to displace axis 722 about which load cog 716 rotates via cog profile 730. FIG. 8A shows assembly 700 of FIG. 7A with rotary force switch 726 rotated from its position in FIG. 7A such that cog profile 730 has caused load cog 716 to move farther away from trigger 706. Furthermore, rotary force switch 726 is configured to modify the torque applied to one end of torsion spring 702 via spring profile 728. In other words, switch 726 is configured to adjust one or more of a first trigger resistance sub-profile (e.g., profile 752 of FIG. 7D before transition 758) and a second trigger resistance sub-profile (e.g., profile 752 of FIG. 7D after transition 758). As shown, rotary force switch 726 has been rotated from its position in FIG. 7A such that spring profile 728 has displaced one end of torsion spring 702 such that torsion spring 702 experiences less torque.

Figure 8B:
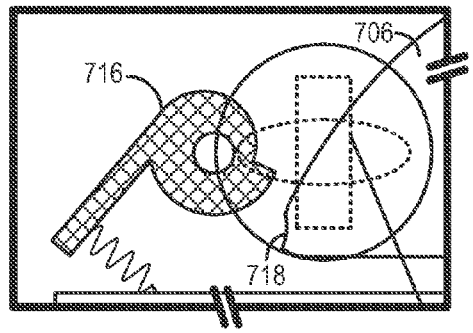
FIG. 8B shows a close-up view of a portion of the assembly of FIG. 8A.

FIG. 8B shows a close-up view of a portion of assembly 700 of FIG. 8A with trigger 706 in the "end" position. As in FIG. 8A, load cog 716 is located far enough away from trigger 706 such that cam profile 718 of trigger 706 does not interact with load cog 716 through the entire range of motion of trigger 706. Therefore, as illustrated in FIGS. 8A and 8B, resistance is provided to trigger 706 during the entire range of the trigger pull by torsion spring 702.

Figure 8C:
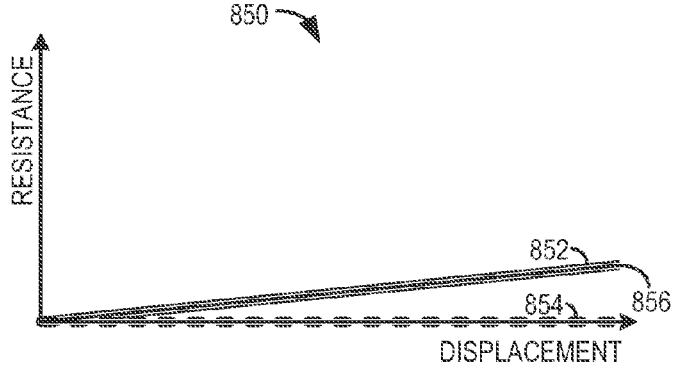
FIG. 8C shows a visual representation of a trigger resistance profile of the assembly of FIG. 8A.

FIG. 8C shows a visual representation 850 of a resistance profile 852 of assembly 700 of FIG. 8A. Visual representation 850 further includes a resistance profile 854 provided by tension spring 724 coupled to load cog 716 (illustrated as a double dashed line) and a resistance profile 856 provided by torsion spring 702 (illustrated as a single line). As described above, resistance profile 852 is substantially the same as resistance profile 856 of torsion spring 702 throughout the entire range of the trigger pull. As such, the resistance profile 852 provided by the assembly of FIG. 8A is similar to that provided by a "standard" trigger (e.g., profile 402 of FIG. 4A).

While FIGS. 7 and 8 illustrate a rotary force switch 726 providing two scenarios (e.g., no load cog interaction and decreased spring torque vs. load cog interaction and increased spring torque), it will be understood that rotary force switch 726 may be configured to provide any number of unique scenarios. For example, rotary force switch 726 may provide for each combination of spring torque and load cog interaction.

The above discussion focused on providing a multi-stage variable resistance to a trigger via two or more subassemblies. However, it will be understood that a multi-stage resistance profile may be provided via one or more electrically-actuatable devices (e.g., a motor or a solenoid). For example, the trigger (or an assembly coupled thereto) may be coupled to the shaft of an electric motor. An electrical signal may then be applied to the electric motor to effect rotation of the shaft, thus resisting motion of the trigger. The electrical signal may be selectively applied to provide multiple stages of resistance. For example, the duty cycle of the electrical signal may be varied to effect changes in resistance. The electrical signal may be defined by, in whole or in part, the trigger resistance information discussed above.

Furthermore, one or more sensors (e.g., optical encoder) may be utilized to provide information relating to the position of the trigger. Such information may be utilized in determining the electrical signal applied to the electrically-actuatable device. In some instances, such as when a servo motor is used, the position sensor may be incorporated into the electrically-actuatable device.

It is to be understood that the configurations and/or approaches described herein are exemplary in nature, and that these specific embodiments or examples are not to be considered in a limiting sense, because numerous variations are possible. In general, two or more trigger subassemblies can be configured to act throughout different ranges of a trigger pull to provide a multi-stage variable resistance trigger. For example, in some embodiments a first trigger resistance sub-profile may be the sum of a first subassembly resistance profile and a second subassembly resistance sub-profile, and a second trigger resistance sub-profile may be the same as only the second subassembly resistance profile without the first subassembly resistance profile. In other embodiments, the first trigger resistance sub-profile may be the same as only the first subassembly resistance profile without the second subassembly resistance profile, and the second trigger resistance sub-profile may be the sum of the first subassembly resistance profile and the second subassembly resistance profile. In other embodiments, a different number of sub-profiles including different combinations of subassembly resistance profiles may be employed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. An input device comprising:
   a communicative output configured to wirelessly send control information to a computing device for controlling the computing device;
   a communicative input configured to receive trigger resistance information from the computing device; and
   a multi-stage variable resistance trigger assembly configured to provide a first trigger resistance sub-profile throughout a first stage of a trigger pull and a second trigger resistance sub-profile throughout a second stage of the trigger pull, the first trigger resistance sub-profile being different from the second trigger resistance sub-profile and each trigger resistance sub-profile being specified by the trigger resistance information received from the computing device, the multi-stage variable resistance trigger assembly including a first subassembly providing a first subassembly resistance profile and a second subassembly providing a second subassembly resistance profile, the first trigger resistance sub-profile being changeable to the second trigger resistance sub-profile responsive to trigger resistance information received from the computing device by selecting a different one or combination of the first subassembly and the second subassembly to provide trigger resistance.

2. An input device comprising:
a communicative output configured to wirelessly send control information to a computing device for controlling the computing device;
a communicative input configured to receive trigger resistance information from the computing device; and
a multi-stage variable resistance trigger assembly comprising a first subassembly providing a first subassembly resistance profile and a second subassembly providing a second subassembly resistance profile, the multi-stage variable resistance trigger assembly configured to provide a first trigger resistance sub-profile throughout a first stage of a trigger pull including resistance provided by at least the first subassembly and a second trigger resistance sub-profile throughout a second stage of the trigger pull including resistance provided by at least the second subassembly, the first trigger resistance sub-profile being different than the second trigger resistance sub-profile and each trigger resistance sub-profile being specified by the trigger resistance information received from the computing device.

3. The input device of claim 2, wherein the first trigger resistance sub-profile includes both the first subassembly resistance profile and the second subassembly resistance profile, and wherein the second trigger resistance sub-profile includes the second subassembly resistance profile without the first subassembly resistance profile.

4. The input device of claim 3, wherein the first subassembly includes a magnet, and wherein the second subassembly includes a trigger spring.

5. The input device of claim 3, wherein the first subassembly includes a load cog, and wherein the second subassembly includes a torsion spring.

6. The input device of claim 2, wherein the first trigger resistance sub-profile includes the first subassembly resistance profile without the second subassembly resistance profile, and wherein the second trigger resistance sub-profile includes both the first subassembly resistance profile and the second subassembly resistance profile.

7. The input device of claim 6, wherein the first subassembly comprises a trigger spring, and wherein the second subassembly comprises a flat spring.

8. The input device of claim 2, wherein the variable resistance trigger assembly includes a resistance selection mechanism to adjust one or more of the first trigger resistance sub-profile and the second trigger resistance sub-profile.

9. The input device of claim 8, wherein the resistance selection mechanism includes an electrically-actuatable device.

10. The input device of claim 9, wherein the electrically-actuatable device includes a motor.

11. The input device of claim 9, wherein the electrically-actuatable device includes a solenoid.

12. The input device of claim 8, wherein the resistance selection mechanism includes a user-actuatable device.

13. The input device of claim 12, wherein the user-actuatable device is a rotatable knob.

14. The input device of claim 2, wherein a transition between the first trigger resistance sub-profile and the second resistance sub-profile is substantially discontinuous.

15. The input device of claim 2, wherein the trigger resistance information is consistent during a single use of the computing device.

16. The input device of claim 2, wherein the trigger resistance information varies throughout a single use of the computing device.

17. The input device of claim 2, wherein the multi-stage variable resistance trigger assembly includes an electrically-actuatable device configured to provide both the first resistance sub-profile and the second resistance sub-profile.

18. An input device comprising:
a communicative output configured to wirelessly send control information to a computing device for controlling the computing device;
a multi-stage variable resistance trigger assembly changeable between a first configuration and a second configuration;
the first configuration providing a first trigger resistance sub-profile throughout a first stage of a trigger pull and a second trigger resistance sub-profile throughout a second stage of the trigger pull, the first trigger resistance sub-profile being different than the second trigger resistance sub-profile and the trigger pull being performed by actuation of a trigger;
the second configuration providing a third trigger resistance sub-profile throughout the first stage of the trigger pull and a fourth trigger resistance sub-profile throughout the second stage of the trigger pull, the third trigger resistance sub-profile being different than the fourth trigger resistance sub-profile; and
a communicative input configured to receive trigger resistance information from the computing device, the trigger resistance information configured to select the first configuration or the second configuration by selectively changing the multi-stage variable resistance trigger assembly between the first configuration and the second configuration, each of the first configuration and the second configuration providing multi-stage resistance to the trigger via one or more different subassemblies or different combinations of subassemblies.

* * * * *